(12) United States Patent
Margolin et al.

(10) Patent No.: US 10,943,092 B2
(45) Date of Patent: Mar. 9, 2021

(54) MONITORING SYSTEM

(71) Applicant: ClairLabs Ltd., Tel Aviv (IL)

(72) Inventors: Ran Margolin, Hod Hasharon (IL);
Adi Berenson, Tel Aviv (IL)

(73) Assignee: CLAIRLABS LTD., Tel Aviv (IL)

( * ) Notice: Subject to any disclaimer, the term of this patent is extended or adjusted under 35 U.S.C. 154(b) by 138 days.

(21) Appl. No.: 16/266,070

(22) Filed: Feb. 3, 2019

(65) Prior Publication Data

US 2019/0362133 A1 Nov. 28, 2019

Related U.S. Application Data

(60) Provisional application No. 62/675,181, filed on May 23, 2018.

(51) Int. Cl.
*G06K 9/28* (2006.01)
*G06K 9/62* (2006.01)
(Continued)

(52) U.S. Cl.
CPC ..... *G06K 9/00268* (2013.01); *G06K 9/00228* (2013.01); *G06K 9/00302* (2013.01);
(Continued)

(58) Field of Classification Search
CPC . G06T 2207/10048; G06T 2207/30201; G06T 2207/30268; H04N 5/332;
(Continued)

(56) References Cited

U.S. PATENT DOCUMENTS 5,689,241 A 11/1997 Clarke, Sr. et al.
6,110,123 A 8/2000 Ishihara et al.
(Continued)

FOREIGN PATENT DOCUMENTS

CN 202119539 U 1/2012
CN 101793562 B 4/2013
CN 109998496 A 7/2019

OTHER PUBLICATIONS

Mingyuan Zhou et al., "Hybrid sensing face detection and registration for low-light and unconstrained conditions", vol. 57, No. 1 / Jan. 1 2018 / Applied Optics, published Dec. 21, 2017, pp. 69-78. (Year: 2017).*

(Continued)

*Primary Examiner* — Brian Werner
(74) *Attorney, Agent, or Firm* — Kligler & Associates Patent Attorneys Ltd

(57) ABSTRACT

A method, system and a computer readable medium for monitoring a person. The method may include (a) acquiring a group of other images and acquiring a group of LWIR of a face of the person. The LWIR imager is mechanically coupled to the other imager has a lower resolution, (b) determining locations of a facial feature of the person within the groups of other and LWIR images, by applying a compensation process for compensating for differences between the acquiring of the group of LWIR images and the acquiring of the group of other images; (c) applying a thermal dynamic analysis on pixels of the facial feature within the LWIR images; and (d) determining, based on an outcome of the thermal dynamic analysis, at least one parameter of the person.

35 Claims, 12 Drawing Sheets

(51) Int. Cl.
*G06T 7/00* (2017.01)
*G06K 9/00* (2006.01)
*G06T 7/73* (2017.01)

(52) U.S. Cl.
CPC ............ *G06K 9/00832* (2013.01); *G06T 7/73* (2017.01); *G06T 2207/10048* (2013.01)

(58) Field of Classification Search
CPC . H04N 5/23219; G06K 9/00221–2009/00328; G06K 9/00255; G06K 9/00261; G06K 9/00832–9/00845
See application file for complete search history.

(56) References Cited

U.S. PATENT DOCUMENTS

| | | | |
|---|---|---|---|
| 7,027,621 B1 | 4/2006 | Prokoski | |
| 7,202,792 B2 | 4/2007 | Zhang et al. | |
| 7,406,184 B2 * | 7/2008 | Wolff | G06K 9/00228 382/115 |
| 7,774,036 B2 | 8/2010 | Halldorsson et al. | |
| 7,803,119 B2 | 9/2010 | Reisfeld | |
| 7,912,534 B2 | 3/2011 | Grinvald et al. | |
| 7,961,906 B2 | 6/2011 | Ruedin | |
| 8,109,634 B2 | 2/2012 | Gil | |
| 8,218,143 B2 | 7/2012 | Gupta | |
| 8,360,986 B2 | 1/2013 | Farag et al. | |
| 8,364,222 B2 | 1/2013 | Cook et al. | |
| 8,456,517 B2 | 6/2013 | Spektor et al. | |
| 8,724,855 B2 | 5/2014 | Kim | |
| 8,734,359 B2 | 5/2014 | Ibanez et al. | |
| 8,790,269 B2 | 7/2014 | Xu et al. | |
| 8,792,948 B2 | 7/2014 | Segman | |
| 8,918,162 B2 | 12/2014 | Prokoski | |
| 8,965,474 B2 | 2/2015 | Yamaguchi | |
| 9,125,606 B2 | 9/2015 | Verkruijsse et al. | |
| 9,483,695 B2 | 11/2016 | Chidanand et al. | |
| 9,501,704 B2 | 11/2016 | Matsuo | |
| 9,517,679 B2 | 12/2016 | Frank et al. | |
| 9,741,113 B2 | 8/2017 | Kikuchi | |
| 9,757,092 B2 | 9/2017 | Oraevsky et al. | |
| 9,829,479 B2 | 11/2017 | Kim et al. | |
| 9,907,474 B2 | 3/2018 | Den Brinker et al. | |
| 9,924,896 B2 | 3/2018 | De Haan et al. | |
| 9,955,880 B2 | 5/2018 | Visvanathan et al. | |
| 10,244,972 B2 | 4/2019 | Tominaga | |
| 10,265,004 B2 | 4/2019 | Yamaguchi et al. | |
| 10,292,662 B2 | 5/2019 | Kirenko | |
| 10,307,098 B2 | 6/2019 | Gareau | |
| 10,357,189 B2 | 7/2019 | Koide et al. | |
| 10,413,226 B2 | 9/2019 | Tao et al. | |
| 10,420,470 B2 | 9/2019 | Kwon et al. | |
| 10,512,426 B2 | 12/2019 | Toya | |
| 10,691,923 B2 | 6/2020 | Li et al. | |
| 2004/0236229 A1 | 11/2004 | Freeman et al. | |
| 2011/0200319 A1 * | 8/2011 | Kravitz | G03B 17/02 396/333 |
| 2017/0098122 A1 | 4/2017 | El Kaliouby et al. | |
| 2018/0186234 A1 * | 7/2018 | Mestha | B60W 50/14 |
| 2020/0155040 A1 * | 5/2020 | Soreefan | A61B 5/0205 |

OTHER PUBLICATIONS

Van Gastel et al., "New principle for measuring arterial blood oxygenation, enabling motion-robust remote monitoring", Scientific Reports, pp. 1-16, Dec. 7, 2016.

Hu et al., "Combination of near-infrared and thermal imaging techniques for the remote and simultaneous measurements of breathing and heart rates under sleep situation", PLOS One, pp. 1-14, Jan. 5, 2018.

Wu et al., "Photoplethysmography imaging: a new noninvasive and noncontact method for mapping of the dermal perfusion changes", Proceedings SPIE 4163, Optical Techniques and Instrumentation for the Measurement of Blood Composition, Structure, and Dynamics, pp. 61-70, Nov. 22, 2000.

Wieringa et al., "Contactless multiple wavelength photoplethysmographic imaging: a first step toward "SpO2 camera" technology", Annals of Biomedical Engineering, vol. 33, No. 8, pp. 1034-1041, Aug. 2005.

He et al., "Deep residual learning for image recognition", Proceedings of the IEEE conference on computer vision and pattern recognition (CVPR), pp. 770-778, year 2016.

* cited by examiner

NIR image 72

LWIR image 73

MONITORING SYSTEM

CROSS REFERENCE

This application claims priority from U.S. provisional patent Ser. No. 62/675,181 filing date May 23, 2018.

BACKGROUND

There may be a need to track people in an accurate, cost effective and robust manner.

SUMMARY

There may be provided a system, a non-transitory computer readable medium and and a method for monitoring a person.

There may be provided a method for monitoring a person, the method may include acquiring a group of longwave infrared (LWIR) images of a face of the person by a LWIR imager; acquiring an other group of images that differ from LWIR images of a face of the person by an other imager that differs from a LWIR imager; wherein the LWIR imager is mechanically coupled to the other imager; determining locations of a facial feature of the person within the group of the LWIR images and within the group of the other images, wherein the determining comprises applying a compensation process for compensating for differences between the acquiring of the group of LWIR images and the acquiring of the group of the other images; applying a thermal dynamic analysis on pixels of the facial feature within the LWIR images; and determining, based on an outcome of the thermal dynamic analysis, at least one parameter of the person.

The spatial resolution of the other imager may or may not exceed a spatial resolution of the LWIR imager.

The other sensor may be a visual light imager that is configured to detect light within at least one spectral band of visual light.

The other imager may be a red, green and blue imager.

The other imager may be a near infrared (NIR) imager and the other group of images may be a group of NIR images.

There may be provided a non-transitory computer readable medium that stores instructions for: acquiring a group of longwave infrared (LWIR) images of a face of the person by a LWIR imager; acquiring an other group of images that differ from LWIR images of a face of the person by an other imager that differs from a LWIR imager; wherein the LWIR imager is mechanically coupled to the other imager; determining locations of a facial feature of the person within the group of the LWIR images and within the group of the other images, wherein the determining comprises applying a compensation process for compensating for differences between the acquiring of the group of LWIR images and the acquiring of the group of the other images; applying a thermal dynamic analysis on pixels of the facial feature within the LWIR images; and determining, based on an outcome of the thermal dynamic analysis, at least one parameter of the person.

The spatial resolution of the other imager may or may not exceed a spatial resolution of the LWIR imager.

The other sensor may be a visual light imager that is configured to detect light within at least one spectral band of visual light.

The other imager may be a red, green and blue imager.

The other imager may be a near infrared (NIR) imager and the other group of images is a group of NIR images.

There may be provided a system that may include a longwave infrared (LWIR) imager, an other imager, a processor and a mechanical setup; wherein the LWIR imager is configured to acquire a group of LWIR images of a face of a person; wherein the other imager is configured to acquire a group of other images of the face of the person; wherein the mechanical setup is configured to mechanically couple the LWIR imager to the other imager; wherein the processor is configured to (a) determine locations of a facial feature of the person within the group of the LWIR images and within the group of the other images, wherein the determining comprises applying a compensation process for compensating for differences between the acquiring of the group of LWIR images and the acquiring of the group of other images; (b) apply a thermal dynamic analysis on pixels of the facial feature within the LWIR; and (c) determine, based on an outcome of the thermal dynamic analysis, at least one parameter of the person.

The spatial resolution of the other imager may or may not exceed a spatial resolution of the LWIR imager.

The other sensor may be a visual light imager that is configured to detect light within at least one spectral band of visual light.

The other imager may be a red, green and blue imager.

The other imager may be a near infrared (NIR) imager and the other group of images is a group of NIR images.

There may be provided a system that may include a local unit and a remote computer; wherein the local unit comprises a longwave infrared (LWIR) imager, an other imager, a processor, and a mechanical setup; wherein the other imager is configured to acquire a group of other images of a face of the person; wherein the LWIR imager is configured to acquire a group of LWIR images of a face of the person; wherein the mechanical setup is configured to mechanically couple the LWIR imager to the other imager; wherein each one of the processor and the remote computer are configured to perform a part of a process that comprises (a) determining locations of a facial feature of the person within the group of the LWIR images and within the group of the other images, wherein the determining comprises applying a compensation process for compensating for differences between the acquiring of the group of LWIR images and the acquiring of the group of other images; (b) applying a thermal dynamic analysis on pixels of the facial feature within the LWIR images; and (c) determining, based on an outcome of the thermal dynamic analysis, at least one parameter of the person.

The spatial resolution of the other imager may or may not exceed a spatial resolution of the LWIR imager.

The other sensor may be a visual light imager that is configured to detect light within at least one spectral band of visual light.

The other imager may be a red, green and blue imager.

The other imager may be a near infrared (NIR) imager and the other group of images is a group of NIR images.

The processor may execute at least a part of at least one of at least one step of steps (a), (b) or (c) and the remote computer may execute the remaining parts of the process. A processing result from the processor may be communicated to the remote computer.

The at least one parameter of the person may be selected out of at least one of (a) a physiological parameter of the person, (b) a psychological parameter of the person, and (c) a behavioral parameter of the person.

The thermal dynamic analysis may be a LWIR thermal dynamic analysis that may be applied on one or more LWIR images.

The thermal dynamic analysis may be a NIR thermal dynamic analysis that may be applied on one or more NIR images.

The thermal dynamic analysis may be applied on one or more NIR images and on one or more LWIR images.

The applying of the thermal dynamic analysis may include applying a neural network based thermal dynamic analysis.

The facial feature may include a left nostril, a right nostril, and a month and wherein the at least one parameter of the user may include a respiration parameter.

The facial feature may include at least one superficial blood vessel and wherein the at least one parameter of the user may include a heart rate parameter.

The at least one parameter of the user may have a frequency within a predefined frequency range, and wherein the applying of The thermal dynamic analysis may include applying a band pass filter for rejecting signals outside the predefined frequency range.

The facial feature may include facial sweat glands and wherein the at least one parameter of the user may include facial sweat glands activity.

The at least one parameter of the person may include facial movement patterns of the person.

The at least one parameter of the person may include a well-being of the person.

The at least one parameter of the person may include an emotion of the person.

The at least one parameter of the person may be a personalized heat flow distribution of the person.

The method may include receiving or calculating compensation parameters that may be applied during the applying of the compensation process.

The method may include calculating the compensation parameters by applying a supervised deep learning training process that involves acquiring NIR images of a thermal target and LWIR images of the thermal target.

The method may include receiving the compensation parameters, wherein the compensation parameters may be generated by applying a supervised deep learning training process that involves acquiring NIR images and LWIR images of a thermal target.

The method may include determining a difference between a (a) location of the facial feature in certain NIR image obtained at a certain point of time, and (b) a location of the facial feature in certain LWIR image obtained at the certain point of time; and determining a distance between the facial feature and at least one of the NIR imager and the LWIR imager, based on the difference.

The method may include validating, for each LWIR image of the LWIR images, the location of facial feature of the person within the LWIR image.

The method may include searching for the head of the person within at least one of the NIR images and the LWIR images.

The method may include performing a driving related operation based on the at least one parameter of the user.

The method may include controlling a driving of the vehicle based on the at least one parameter of the user.

The non-transitory computer readable medium may store instructions for receiving or calculating compensation parameters that may be applied during the applying of the compensation process.

The non-transitory computer readable medium may store instructions for calculating the compensation parameters by applying a supervised deep learning training process that involves acquiring NIR images of a thermal target and LWIR images of the thermal target.

The non-transitory computer readable medium may store instructions for receiving the compensation parameters, wherein the compensation parameters may be generated by applying a supervised deep learning training process that involves acquiring NIR images and LWIR images of a thermal target.

The non-transitory computer readable medium may store instructions for determining a difference between a (a) location of the facial feature in certain NIR image obtained at a certain point of time, and (b) a location of the facial feature in certain LWIR image obtained at the certain point of time; and determining a distance between the facial feature and at least one of the NIR imager and the LWIR imager, based on the difference.

The non-transitory computer readable medium may store instructions for validating, for each LWIR image of the LWIR images, the location of facial feature of the person within the LWIR image.

The non-transitory computer readable medium may store instructions for searching for the head of the person within at least one of the NIR images and the LWIR images.

The non-transitory computer readable medium may store instructions for performing a driving related operation based on the at least one parameter of the user.

The non-transitory computer readable medium may store instructions for controlling a driving of the vehicle based on the at least one parameter of the user.

The system may be configured to receive or calculating compensation parameters that may be applied during the applying of the compensation process.

The system may be configured to calculate the compensation parameters by applying a supervised deep learning training process that involves acquiring NIR images of a thermal target and LWIR images of the thermal target.

The system may be configured to receive the compensation parameters, wherein the compensation parameters may be generated by applying a supervised deep learning training process that involves acquiring NIR images and LWIR images of a thermal target.

The system may be configured to determine a difference between a (a) location of the facial feature in certain NIR image obtained at a certain point of time, and (b) a location of the facial feature in certain LWIR image obtained at the certain point of time; and determining a distance between the facial feature and at least one of the NIR imager and the LWIR imager, based on the difference.

The system may be configured to validate, for each LWIR image of the LWIR images, the location of facial feature of the person within the LWIR image.

The system may be configured to search for the head of the person within at least one of the NIR images and the LWIR images.

The system may be configured to perform a driving related operation based on the at least one parameter of the user.

The system may be configured to control a driving of the vehicle based on the at least one parameter of the user.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
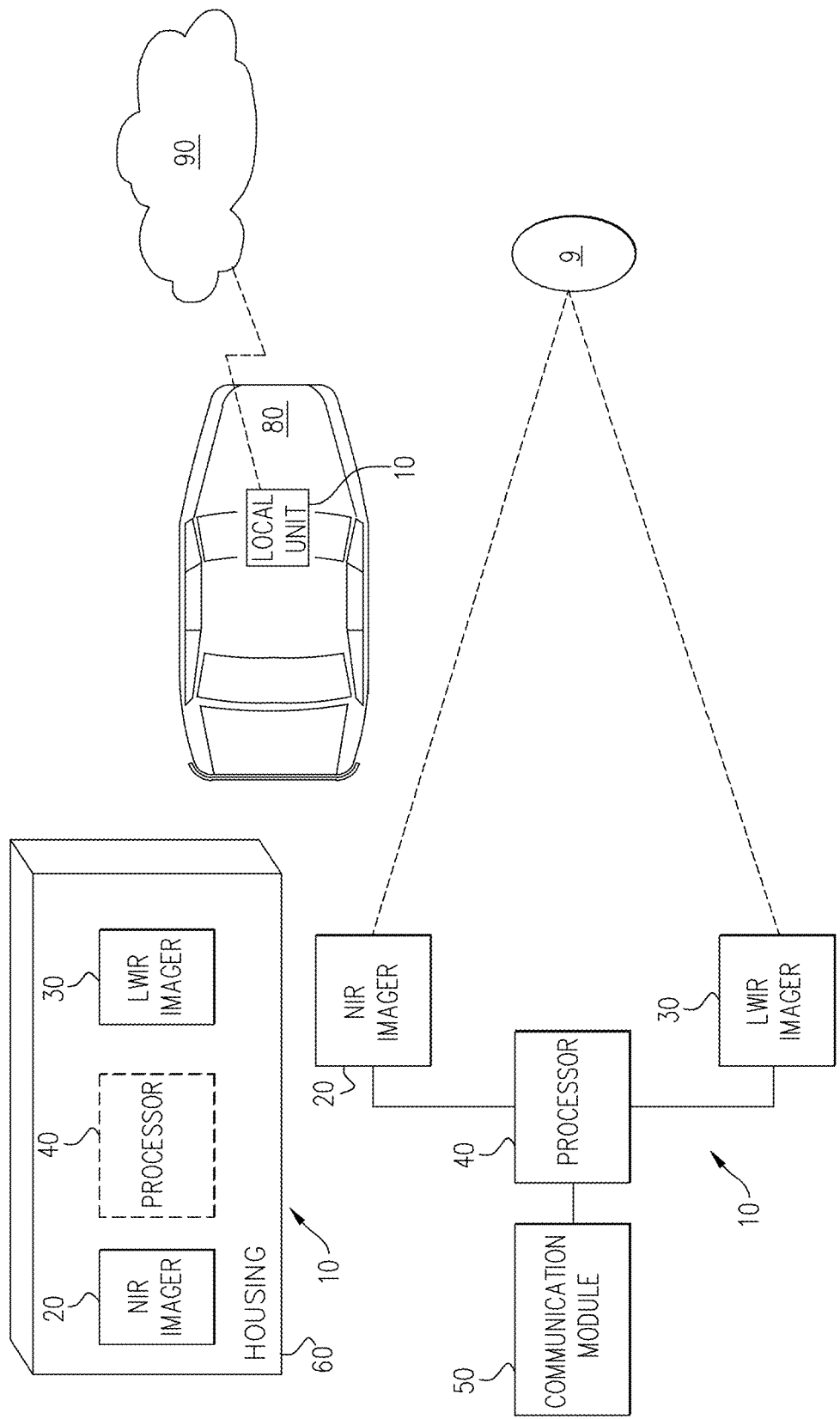
FIG. 1 is an example of a system.

There may be provided a system for remote and contactless detection of mental and physiological parameters of humans such as respiration rate, heart rate, body temperature, sweat, stress, cognitive load and more simultaneously for several people being in rest or in motion situated in a stationary environment or a moving/vibrating environment.

Implicit assessment of people's mental and physical state may be of critical importance in a wide range of situations: the elderly living independently at home, infants alone in the nursery, patients recovering in hospital general wards, people waiting for treatment in ER waiting rooms, people waiting for service in train stations, banks, airports and more. The general idea is to give people a sense of security, a sense of being looked after even in situations in which they are not around their love ones and/or care givers or in situations in which they are alone. Alternatively, the idea is to give service operators the ability to detect and be notified about potential situations that require their attention with respect to people in their premises using their services.

One such special case is the expected arrival of driverless transportation services. In tomorrow's world of transportation, people will consume transportation as service using driverless cars or shuttles. Without driver supervision, future vehicles will be expected to autonomously detect and report:
 a. Unsafe passenger behavior: over occupancy, unsafe position/posture, use of seat belts as well as unsafe handling of babies and infants
 b. Situations of emergency: health or injury resulted emergencies (bleeding, stopped breathing, heart stopped beating, loss of consciousness, . . . ) or security emergencies (threatened by strangers either sneaking into the vehicle or sharing the ride)
 c. Extreme discomfort: ride anxiety and/or motion sickness/nausea Two major prior art solution may include
a. Surface movements/vibrations analysis using RADARs
b. Surface movements/vibrations analysis using speckle processing The RADAR based solutions suffer from the following limitations:
 a. Difficulties in separating between signals bouncing from different people in a cluttered environment and therefore offer very limited support for simultaneous multi-person physiometrics
 b. Difficulty in separating between vibrations resulted from environmental vibrations (e.g. a moving vehicle) and vibrations resulted from movement of internal organs. The result is difficulty in physiometric sensing of people in a moving/vibrating environment Speckle based solutions suffer from the following limitations:
 a. Active (projected collimated beams) and therefore limited in range and FoV
 b. Difficulty in separating between vibrations resulted from environmental vibrations (e.g. a moving vehicle) and vibrations resulted from movement of internal organs. The result is difficulty in physiometric sensing of people in a moving/vibrating environment The proposed system and method is capable performing physiometric sensing:
 a. Seamlessly and implicitly without any participation of the monitored subjects
 b. Simultaneously for several people (for all people in its range and field of view)
 c. Vehicle being in rest or in motion.
 d. In a stationary or moving/vibrating environment
 e. In all applicable lighting conditions (from direct sun light to complete darkness).
 f. In all applicable temperatures.

The System

It is assumed, for simplicity of explanation, that the other sensor (that differs from the LWIR sensor) is a NIR sensor and that spatial resolution of the other imager exceeds a spatial resolution of the LWIR imager.

The proposed system may include a local unit that may include one or more LWIR imager (thermal imager), one or more NIR imager, a mechanical setup to keep them both aligned and with a pre-defined disparity, a processor for local signal processing and a communication module.

The system may also include a remote computer for collecting and processing data. The remote computer and the local unit may communicate, directly or indirectly in one or more manners—including wireless communication, wired communication, Internet and the like.

Using a high resolution high frame rate NIR imager perfectly synchronized, registered and aligned with a low cost, low resolution, low frame rate LWIR, we get a low-cost system that offers performance and sensing capabilities so far offered by multi-thousand dollars solutions.

FIG. 1 illustrates a system that includes a local unit 10 that includes NIR imager 20, a LWIR imager 30, processor 40, communication module 50 and a mechanical setup such as a housing 60 in which these components are located. The local unit 10 may communicate with a remote computer 90 that may be that may be a cloud computer, a server, and the like.

In FIG. 1 the local unit 10 is installed in a vehicle 80 and may observe the driver and a person that is seated near the driver.

Figure 2:
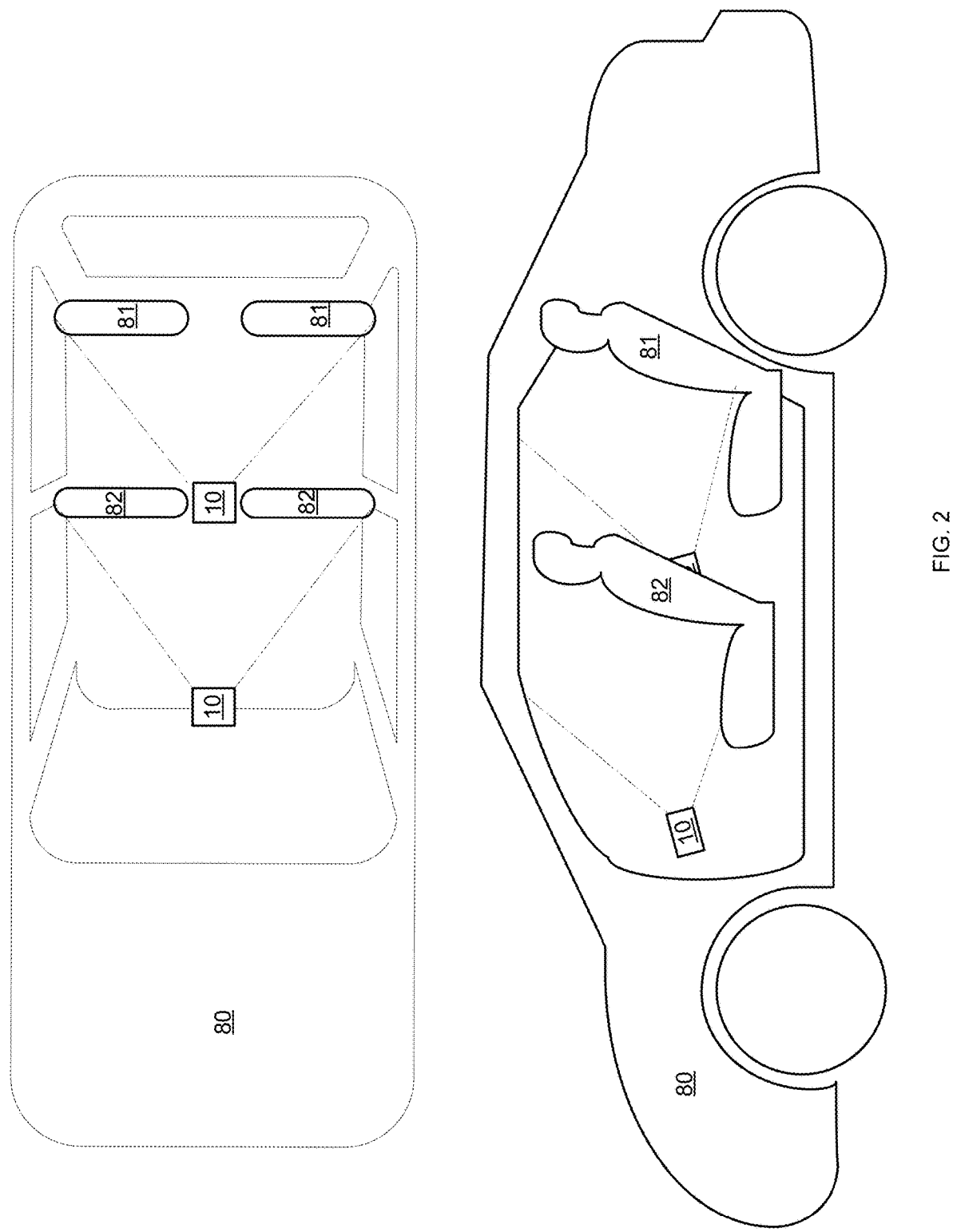
FIG. 2 is an example of a system.

FIG. 2 illustrates a vehicle that is equipped with two local units 10—one for monitoring the persons in the front seats 82 and one for monitoring the persons seated in the back seats 81.

Any number of systems may be located at any point of the vehicle to monitor the persons within the vehicle 80.

A single local unit may include multiple NIR imager and multiple LWIR imagers that may be located at different locations and/or in different housings. There may be any ratio between the number of NIR imager and LWIR imager pairs and the number of processors.

Figure 3:
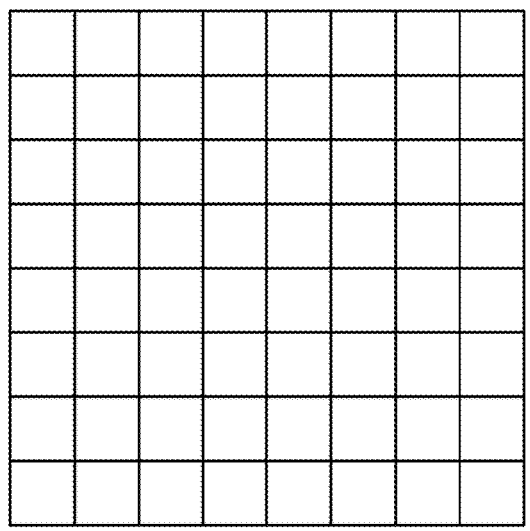
FIG. 3 is an example of a NIR imager and a LWIR imager.
Figure 3:
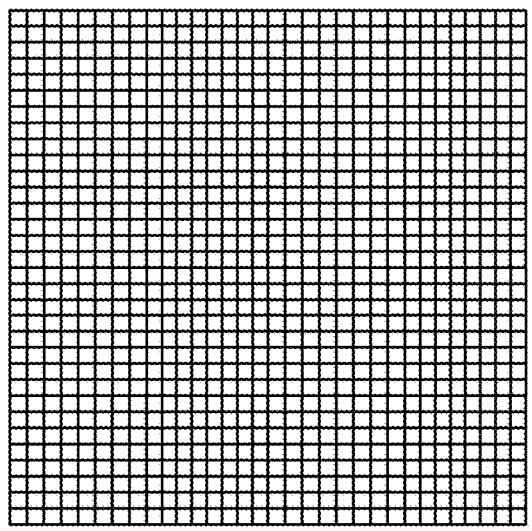

FIG. 3 illustrates that the NIR imager 20 is of finer resolution (smaller pixels) than the LWIR imager 30.

The system of FIGS. 1 and 2 may perform the following:
 a. Both LWIR and NIR signals are used for robust detection of people in the scene.

b. People detection using visible or NIR relies mainly on face detection, shape classification or motion.

Face detection requires the detected persons to face the camera and shape/motion classification is prone to false positives.

The initial segmentation of the scene to "human head" candidates based on the typical thermal footprint of the human faces/heads as captured by the LWIR imager and classified using deep learning based algorithms is not only more efficient but also reduces false positives and increases detection rate. This is especially true in difficult scenarios such as cluttered scenes with a lot of occlusions. The idea of using human thermal footprint can be extended from searching of heads to identifying full human bodies in the scene.

The registered and synchronized high resolution NIR signal can now be used to identify and track facial features by limiting its search to areas of identified human heads.

After identifying facial features, the registered and synchronized LWIR signal is then used to analyze The thermal dynamics around human features (such as mouth, nostrils, forehead, temples and so on) to calculate physiological features such as respiration rate, heart rate, body temperature, sweat, heat flux distribution and so on.

The operation of the described system can be divided into the following phases:

Phase 1—Calibration

This phase is done for each system (rather each local unit)—and may be a part of its manufacturing process. In this phase, each system is presented with a target that has a known visual and thermal footprint.

This can be achieved using a target that combines a visual chessboard pattern with electrical wires that are installed on the chessboard along the chessboard lines. Any other target that includes reference elements can be used (e.g. circular patterns).

Figure 4:
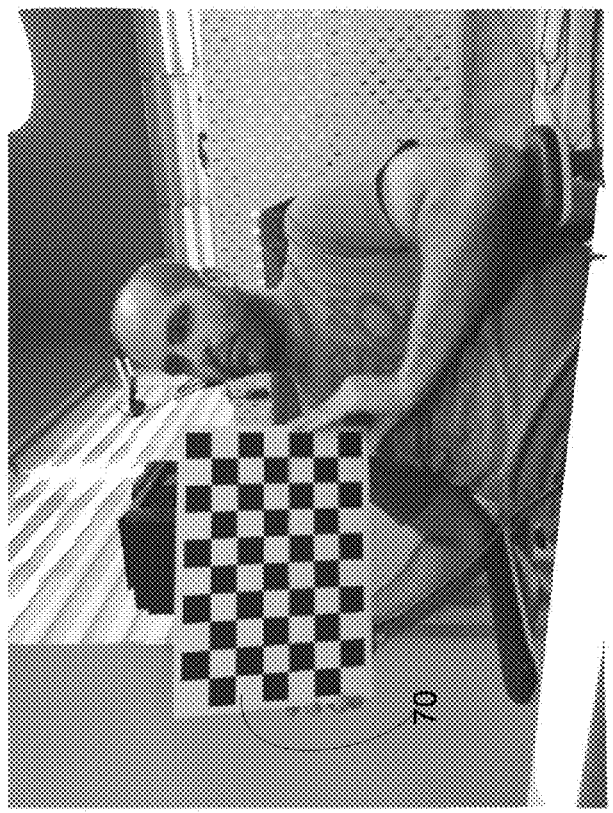
FIG. 4 is an example of a NIR image and a LWIR image.
Figure 4:

FIG. 4 illustrates a LWIR image 73 and a NIR image 72 of the target and some persons. The NIR image 72 is a grayscale image. NIR image 72 involves illuminating the scene in a wavelength that is not visible by the naked eye.

Figure 5:
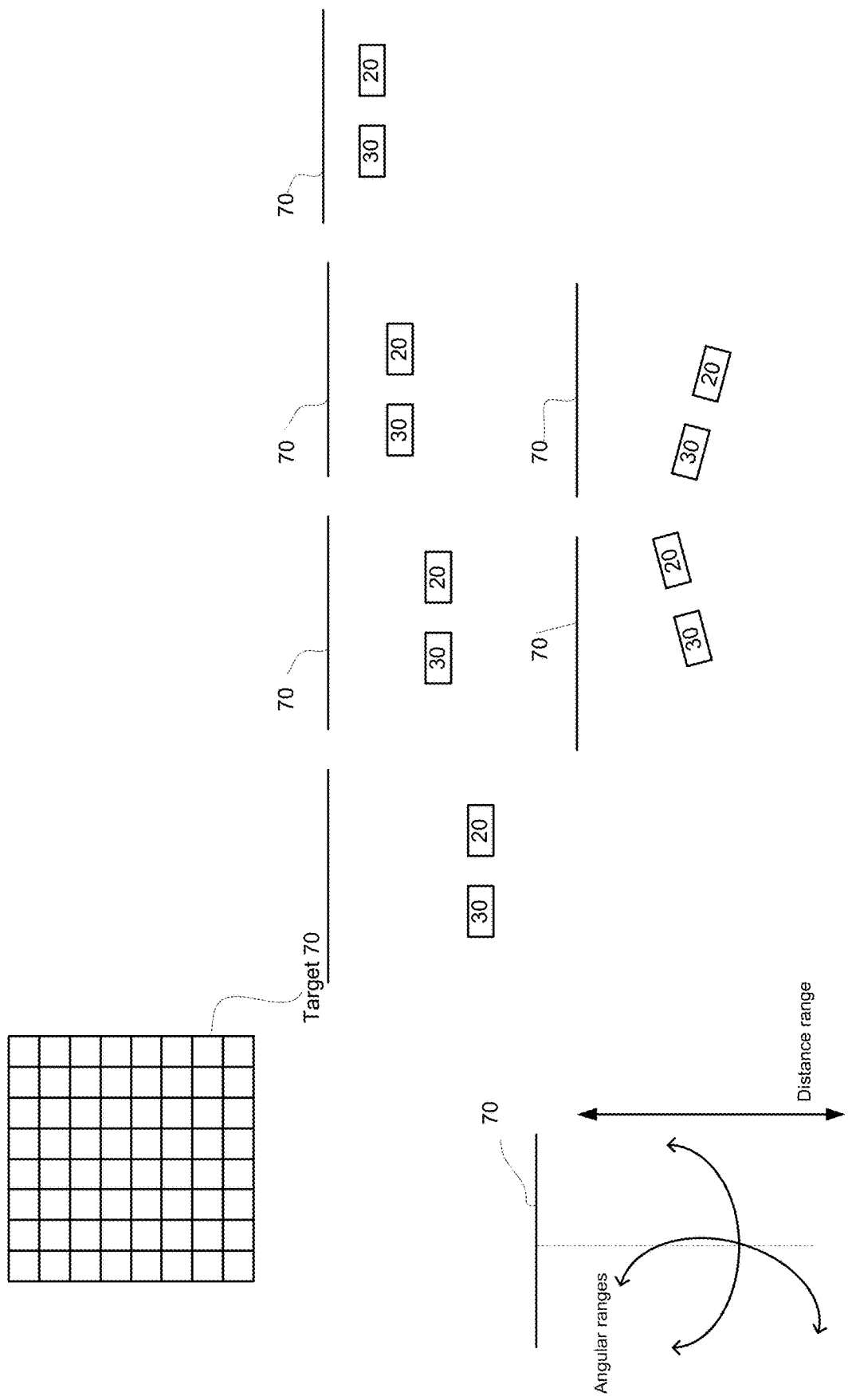
FIG. 5 is an example of a calibration process.

The calibration phase may include acquiring images of the target at different distances from the local unit and at different angles in relation to the local unit—as illustrated on FIG. 5.

The calibration may also use a depth (distance) sensor that may provide the true distance between the local unit and the target.

Figure 6:
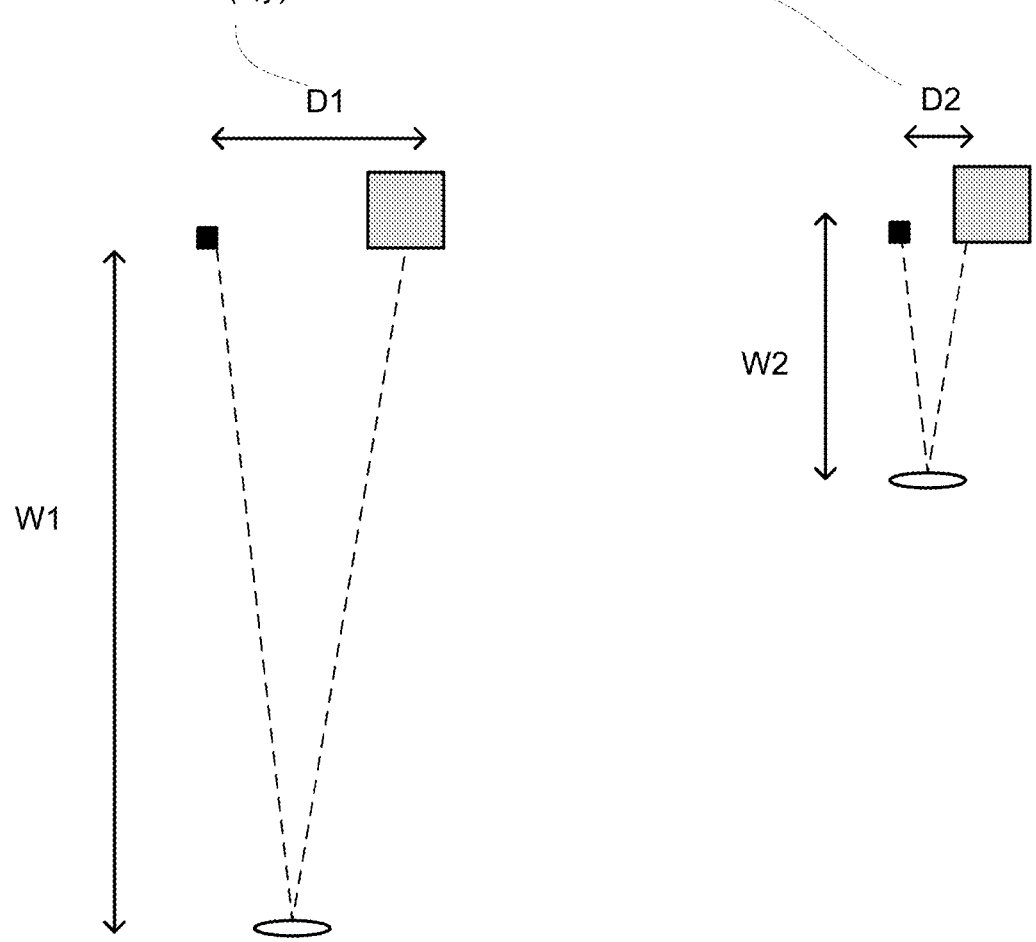
FIG. 6 is an example of a triangulation process.

The local unit may estimate the distance to the target by using triangulation—as the difference in distance is represented by a distance between the location of a NIR pixel of the target and a corresponding LWIR pixel of the target—as illustrated in FIG. 6.

Regarding the target—when current flows through the wires it generates heat and this way we get a heat pattern aligned with the visual pattern (image below). The target is presented to the system in different distances, different positions and different angles. By analyzing the way the target is perceived by the two imagers, the calibration software calculates the intrinsic parameters of each imager and the extrinsic parameters between imagers (e.g. baseline, translation, rotation and so on). Any other calibration may be used.

Phase 2—Adaptive Registration

Most multispectral (multi-imager) systems employ static registration. Meaning, registration that was calculated for a single predefined distance. The disparity differences between objects positioned in different distances from the camera is negligible for objects that are far away from the camera (>10 m) but can be substantial for objects that are closer to the camera. In cases where the system is required to perform accurately in distances as short as 50 cm—static registration may not be satisfactory.

The process of adaptive registration may include a development phase—training the system using recorded data from NIR/LWIR/Depth sensor rig. The depth sensor is used as ground truth for facial landmarks distance and labeling for deep learning based training of the NIR/LWIR system to match facial landmarks.

The adaptive registration may include training one or more neural networks to correlate between LWIR pixels and NIR pixels of the same element—provide high correlation scores to NIR pixels and LWIR pixels of the same element and provide a low correlation score to NIR pixels and LWIR pixels of different elements.

The same element may mean the same human feature of the same person.

The training may be a supervised training in which LWIR pixels and NIR pixels are fed to the same one or more neural networks, whereas the one or more neural networks may also receive indication about whether the LWIR pixels and the NIR pixels refer to the same element.

The training may include training the one or more neural networks to provide a high correlation score to NIR pixels and LWIR pixels of the same human feature of the same person.

The training may include training the one or more neural networks to provide a low correlation score to NIR pixels and LWIR pixels of different human features of the same person.

The training may include training the one or more neural networks to assign a low correlation score to NIR pixels and LWIR pixels of a human feature of different persons.

Figure 7:
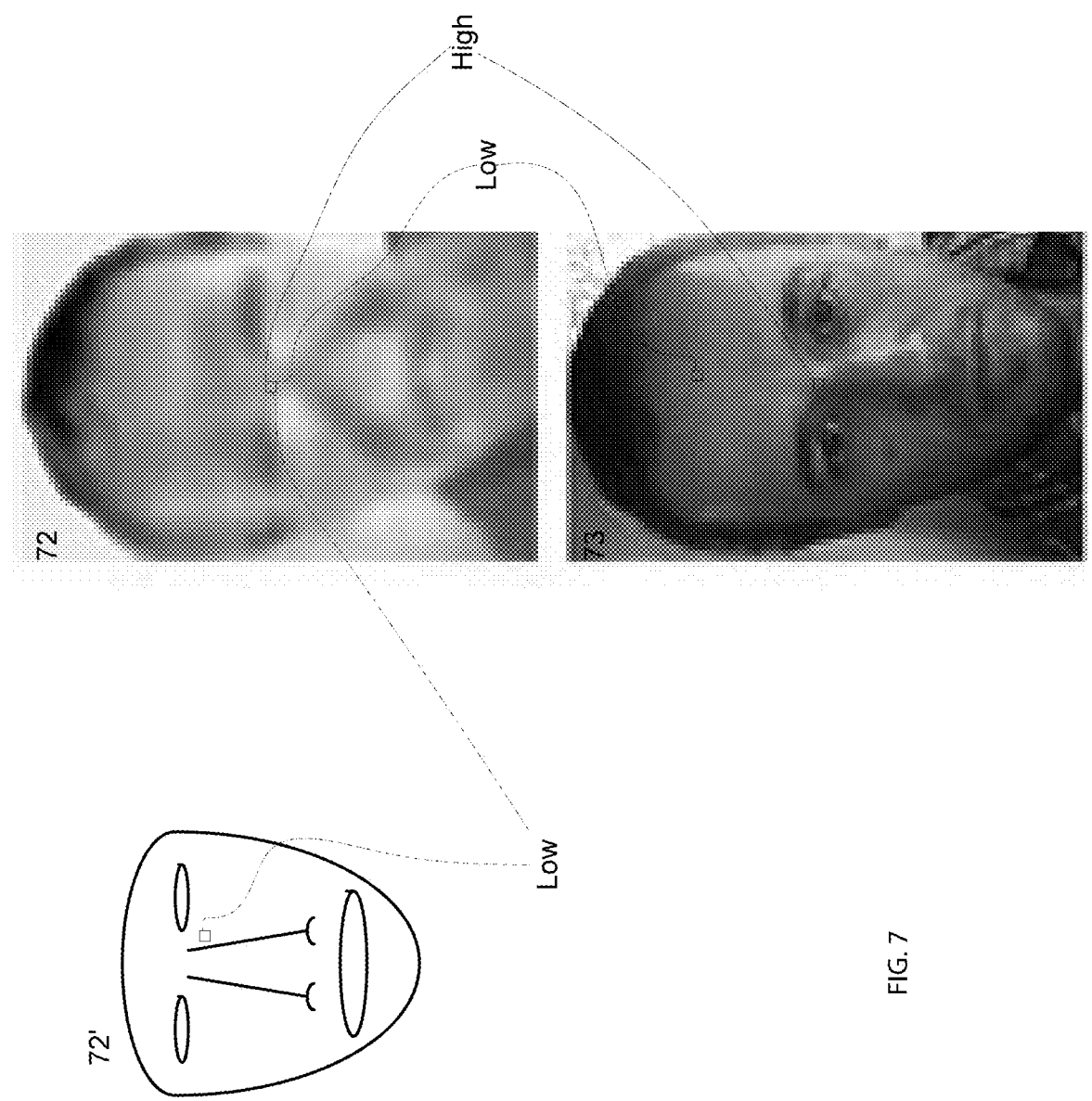
FIG. 7 is an example of NIR images and a LWIR image.

FIG. 7 illustrates an LWIR image 72 and a NIR image 73 of a face of a person and a NIR image 72' of another person.

FIG. 7 also illustrates the assignment of a high correlation score to an NIR pixel and a LWIR pixel that represent the same human features of the same person, an assignment of a low correlation score to an NIR pixel and a LWIR pixel that represent different human features of the same person, and the assignment of a low correlation score to an NIR pixel and a LWIR pixel that represent the different human features of different persons.

Run-time

The system performs human feature detection using the LWIR signal. LWIR signals are more reliable than NIR signals. A NIR image may result in many false alarms and missed detections. For instance it would detect a picture of a human feature on a t-shirt as the human feature. The LWIR system is both more accurate and more efficient: The features that discriminate a human feature in a scene in LWIR are much larger and apparent than in NIR. A human feature may be any part of the human body—head, hand, eye, nostril, nose, and the like.

Therefore the human feature detection can be executed using the low-resolution LWIR image and this is more computationally efficient.

Because the NIR imager and the LWIR imager acquire their images from different angles—the NIR image and the LWIR image first undergo an image rectification—which is a transformation process used to project images onto a common image plane (see—the value "image rectification" in www.wikipedia.org). Thus—the image rectification results in a rectified LWIR image and a rectified NIR image.

The rectification may be required because the epipolar lines (i.e. the lines that we search on) may fall (under some scanning patterns) horizontally since scanning an image horizontally (or vertically) is much more computationally efficient (on top of not needing to compute the scanning trajectory for each feature) since this results in a consecutive memory read. This in turn allows to crop a region of the memory (image patch) and insert it into the network as a search region.

For each human feature detected in the rectified LWIR image—the method finds the appearance of the corresponding human feature in the rectified NIR signal by scanning according to a pattern—for example horizontally and/or vertically or in any other orientation. Thus, when a human feature appears in a certain region (for example line) of the rectified LWIR image—the search for the human feature in the same region within the rectified NIR image.

The search has to take into account the differences (different modalities) between the rectified NIR image and the rectified LWIR image.

The search may involve feeding a region of the rectified LWIR image and a corresponding region of the NIR image to one or more neural networks that was trained to find correlations between the rectified NIR image and the rectified LWIR image.

The one or more neural networks may be trained to correlate between LWIR pixels and NIR pixels of the same element—provide high correlation scores to NIR pixels and LWIR pixels of the same element and provide a low correlation score to NIR pixels and LWIR pixels of different elements.

The same element may mean the same human feature of the same person.

The training may be a supervised training in which LWIR pixels and NIR pixels are fed to the same one or more neural networks, whereas the one or more neural networks may also receive indication about whether the LWIR pixels and the NIR pixels refer to the same element.

The one or more neural networks may be trained to provide a high correlation score to NIR pixels and LWIR pixels of the same human feature of the same person.

The one or more neural networks may be trained to provide a low correlation score to NIR pixels and LWIR pixels of different human features of the same person.

The one or more neural networks may be trained to assign a low correlation score to NIR pixels and LWIR pixels of the a human feature of different persons.

The one or more neural networks may be arranged in a NIR pipe and a LWIR pipe—each may include multiple stages or a convolutional neural network—or multiple convolutional neural networks.

For example—multiple stages may apply at least some of the following operations (a) applying multiple convolution kernels, (b) rectification (mapping negative values to zero), (c) max-pooling (selecting local maxima) and (d) batch normalization.

For example—the last stage includes (a), (c) and (d). Other stages may include (a), (b), (c) and (d).

The NIR pipe and the LWIR pipe may be followed by a best matching unit that finds the best matching NIR pixel within the region of the NIR pixels (that best matches the LWIR pixel)—this may involve correlations.

When a match is found the method measures the distance between the location of the pixel/region in NIR and in the LWIR which is the disparity from which the distance of this head from the camera is calculated (using triangulation).

For each human feature matched, validation is performed on the NIR signal. Validation may be performed by passing a cropped region of the NIR image (that represents the human feature) into a small classifier network. Since the combination of the two signals results in high certainty. A low confidence threshold may be selected for this classifier. Since different human features are more distinct in different modalities.

For each person in the vehicle the method may perform facial landmarks detection using both the rectified NIR image The rectified LWIR image.

The outcome of the process is having the same human features detected on both NIR and LWIR frames with x,y and distance information per feature.

Any other adaptive registration may be used.

Figure 8:
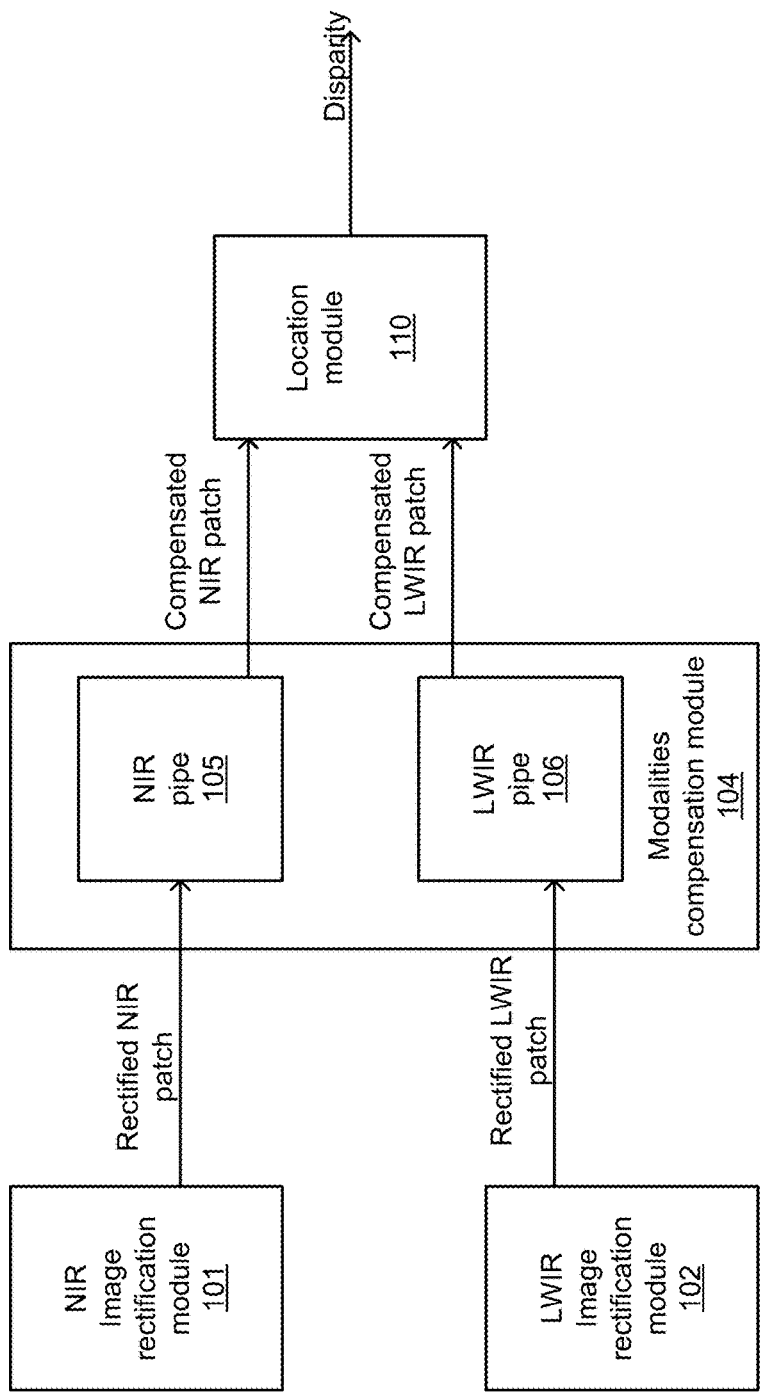
FIG. 8 is an example of a method.

FIG. 8 illustrates a method that includes:
a. Receiving a NIR image, by a NIR image rectification module 101.
b. Applying, by the NIR image rectification module 101 and image rectification process to provide a rectified NIR image.
c. Receiving a LWIR image, by a LWIR image rectification module 102.
d. Applying, by the LWIR image rectification module 102 and image rectification process to provide a rectified LWIR image.
e. Repeating, for each rectified NIR patch (within a certain region) and each rectified LWIR patch (within a corresponding certain region), a modalities compensation process (by modalities compensation module 104)—for allowing to find matches between LWIR pixels and NIR pixels—despite the difference in the modalities between the LWIR image acquisition and the NIR image acquisition. The modalities compensation process may include (a) processing the rectified NIR image patch by one or more neural networks such as a NIR pipe (a sequence of neural networks or a sequence of neural network stages) to provide a compensated NIR patch, and (b) processing the rectified LWIR image patch by one or more neural networks such as a LWIR pipe (a sequence of neural networks or a sequence of neural network stages) to provide a compensated LWIR patch.
f. Determining, for each compensated NIR patch of the certain region the best matching compensated LWIR patch (by location unit 110)—and outputting as an output a disparity—the spatial relationship between (a) the location of the compensated NIR patch of the certain region and (b) the location of the compensated LWIR patch of the corresponding certain region.

Figure 9:
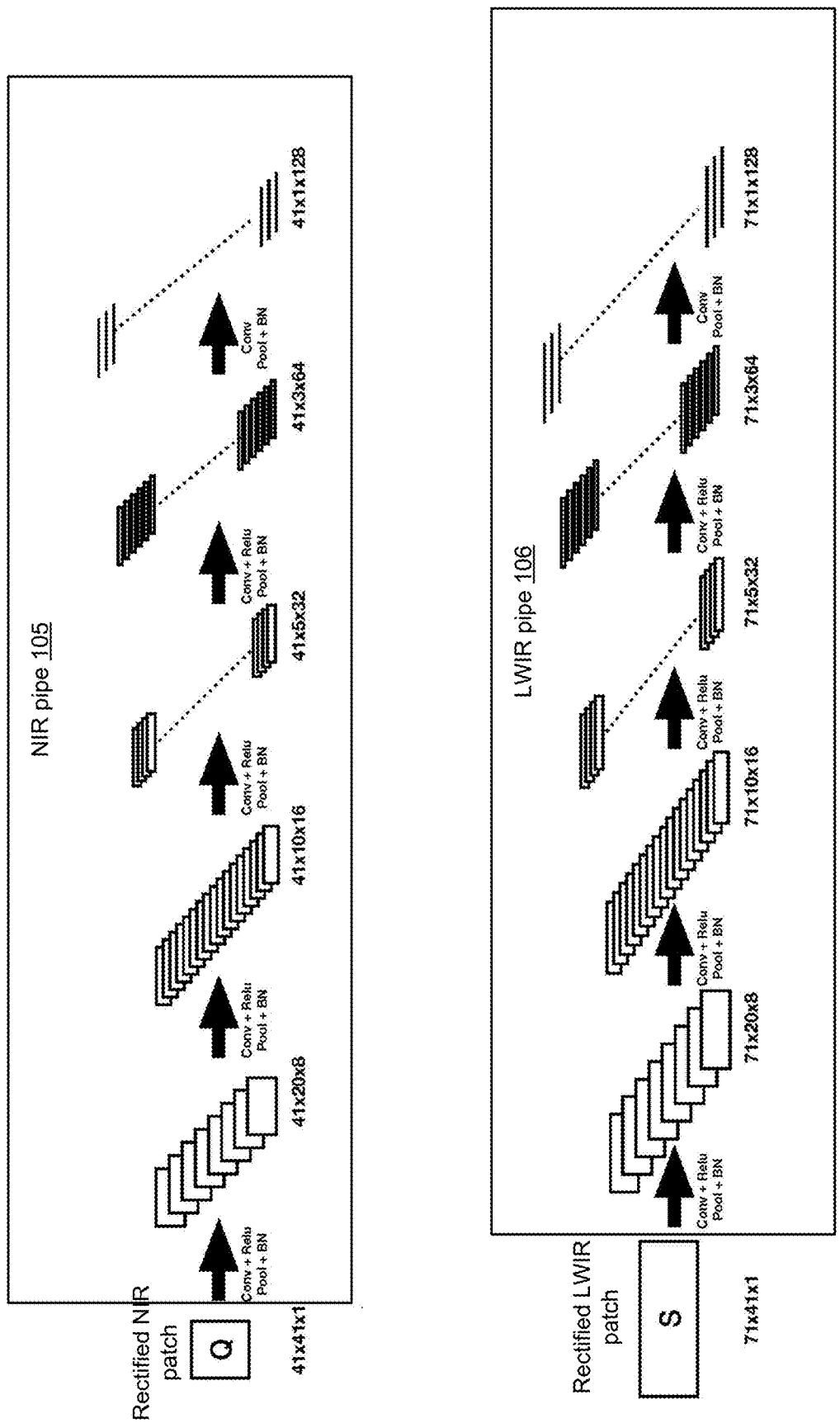
FIG. 9 is an example of a NIR pipe and a LWIR pipe.

FIG. 9 illustrates the NIR pipe 105 and the LWIR pipe as including multiple neural networks—or multiple neural network stages that were trained during the training process.

The number of pixels per patch, the number of kernels and any number illustrated in FIG. 9 (as well as in other figures) are merely non-limiting examples.

Phase 3—Physiological Features Extraction

After the system has accurate real-time position of facial features at the LWIR frames it can start analyzing thermal dynamics in order to measure physiological features.

Figure 10:
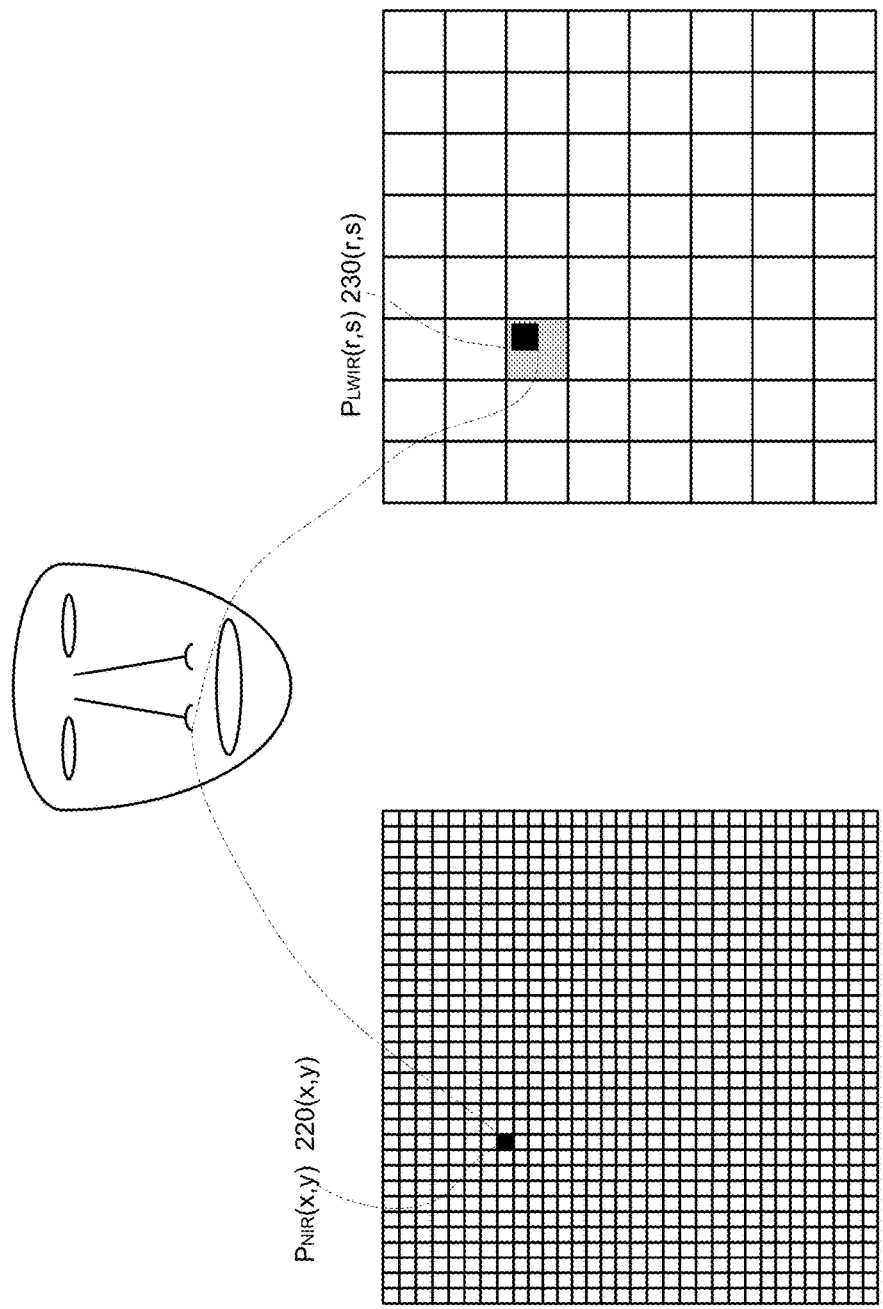
FIG. 10 is an example of a NIR image and a LWIR image.

FIG. 10 illustrates finding a NIR pixel $P_{NIR}(x,y)$ 220$(x,y)$ that is located at the x'th row and y'th column in a NIR image and a matching LWIR pixel $P_{LWIR}(r,s)$ 230$(r,s)$ that is located at the r'th row and s'th column in a LWIR image.

These matching pixels can be sued to detect physical events and/or physiological features.

Figure 11:
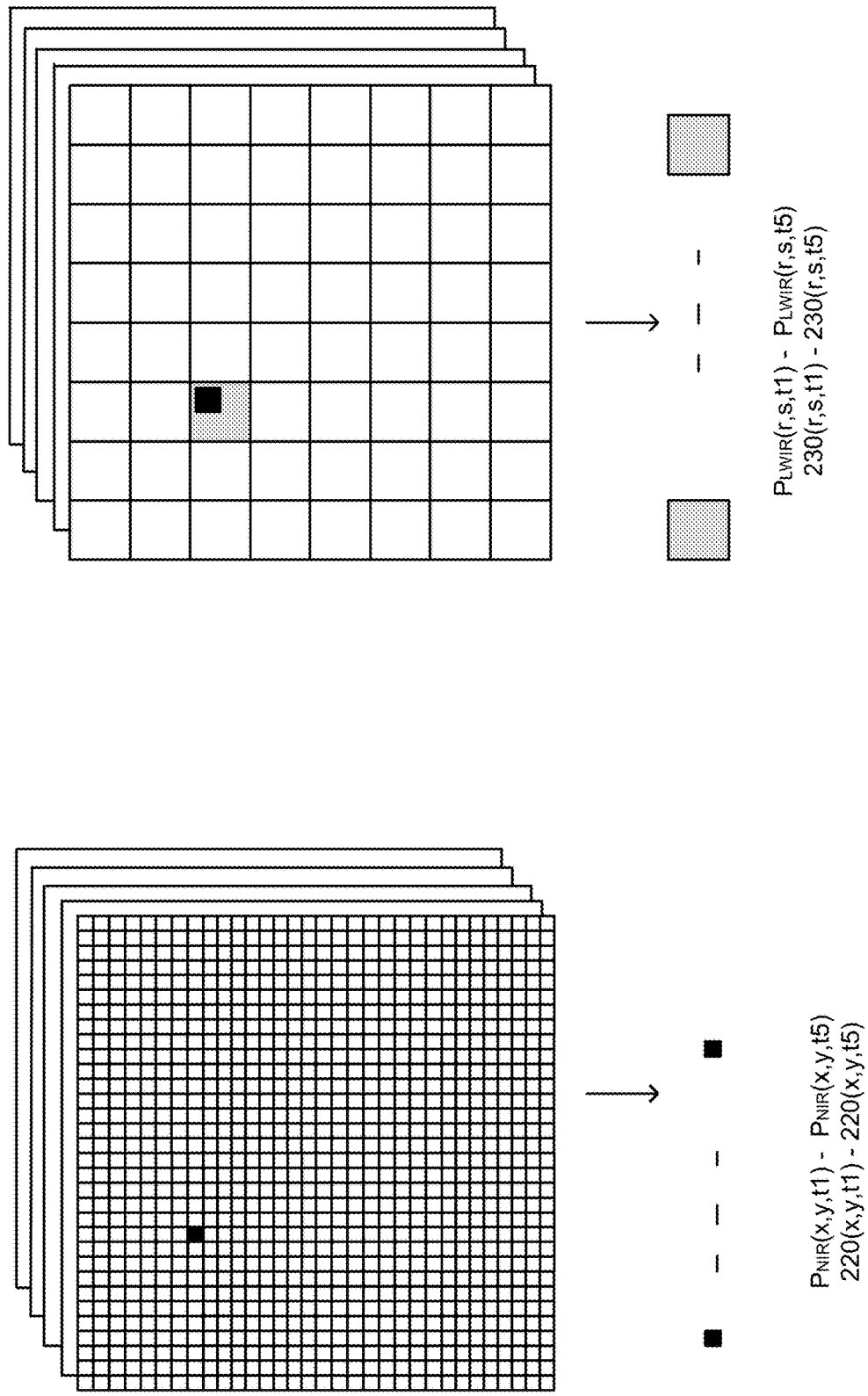
FIG. 11 is an example of NIR images and LWIR images.

FIG. 11 illustrates a sequence of images taken at five points of time t1, t2, t3, t4 and t5—as well as NIR pixels $P_{NIR}(x,y,t1)$—$_{NIR}(x,y,t1)$ 220$(x,y,t1)$—20$(x,y,t5)$ that are located at the x'th row and y'th column in the five NIR images and matching LWIR pixels $P_{LWIR}$(r,s,t1)—$P_{LWIR}$(r,s,t5) 230(r,s,t1)—230(r,s,t5) that is located at the r'th row and s'th column in the five LWIR images.

Finding these matching pixels may allow to track changes over time—which is beneficial when analyzing physiological features.

Non limiting example of the physiological features may include:

a. Respiration Profiling: generating time series of LWIR pixel values of left nostril, right nostril and mouth. These time series are then fed into a deep neural networks which performs a regression for breath rate, minute ventilation, and classification of various known breathing patterns.
b. Heart Rate: to measure the heart-rate. The thermal fluctuations of superficial blood vessels is monitored. The estimated location of these blood vessels is obtained from the facial landmarks previously detected. A time series of pixel values is generated per tracked location. Each of these time-series is passed through a band-pass filter to attenuate signals outside of human heart-rate range. Since the pulse modulates the surface temperature around superficial blood vessels the system may find the pulse frequency in the external temperature time series around superficial blood vessels. Each of the time series is passed through a neural network to provide an estimation of the heart-rate and confidence level. A voting scheme is then performed to offer a robust and reliable heart-rate measurement.
c. Classification of Heat Flux Distribution: Since skin temperature is highly sensitive to local thermal influences (e.g. air-condition or open window) a deep neural network can be used for outlier detection and estimation of an individual's heat flux distribution. The input to the deep neural network are the cropped faces and a localization of the tracked facial features (either in spatial form such as heat-maps or in feature-form such as coordinates). The deep neural network may include three modules: Flux feature extraction, Personalization and classification.
d. Flux Feature Extraction: The input into this module are the cropped faces and facial feature localization. This module consists of a semantic segmentation step that consists of multiple steps of convolutions with down-sampling followed by convolutions with up-sampling. This results in a labeled heat-map that emphasizes and discriminates between salient regions for heat-flux analysis. The output is then concatenated with the LWIR signal and fed into multiple convolution layers followed by several fully-connected layers to embed the features in some latent space.
e. Personalization: Since facial heat distribution is not locally independent, this distribution is learned over time and a personalized profile is generated. The profile is initially set as the pre-learned average distribution, with a low confidence level. As the output of the previous module are received, a profile is learned. One possible solution to learn the profile is by applying a running mean. As the convergence rate decreases, the confidence level increases. This profile is then used as a prior to the following module.
f. Classification: The profile and the flux feature vector are fed into multiple fully connected layers to output confidence and classification of various physiological states such as thermal comfort, stress, cognitive load, etc.
g. Facial sweat glands activity: analysis of LWIR frames in order to assess facial sweat glands activity by the appearance of cold dots over the face main in the maxillary, perioral, and nose tip regions in order to measure sympathetic response. This is basically a contactless alternative to GSR (Galvanic Skin Response).
h. Analysis of facial movement pattern—monitoring facial movements including pupil movements, changes in head orientation, analysis of expressions, analysis of feelings (fear, happiness, gaze direction, eyelid movements. The analysis may be based, mainly on the NIR image of the face and even on a monochromatic image (or gray level information) that can be used for analysis at different illumination conditions. The analysis may track various facial features.
i. Wellbeing analysis The system may monitor a well-being of a monitored person passenger. For example, by analyzing any of the parameters mentioned above, the system can identify a state of breathing that gradually becomes flat and monotonous, distinctly from the standard breathing pattern of people in general driving mode and the specific driver/passenger. Identifying this change as an example may indicate a driver who is in the initial stages of falling asleep. Similarly, the system will perform analysis to identify the driver/passenger wellbeing, which can include identification of the drowsiness level, stress level and stress/flight characteristics, cognitive load, lack of awareness, tranquility, relaxation, comfort, thermal comfort and more. For each mental state in fact, the relevant and optional mix of indicators will be calculated, so that the system will include a set of rules and decisions that refines itself with the activity of the system and is based on statistical principles and previous studies.

Figure 12:
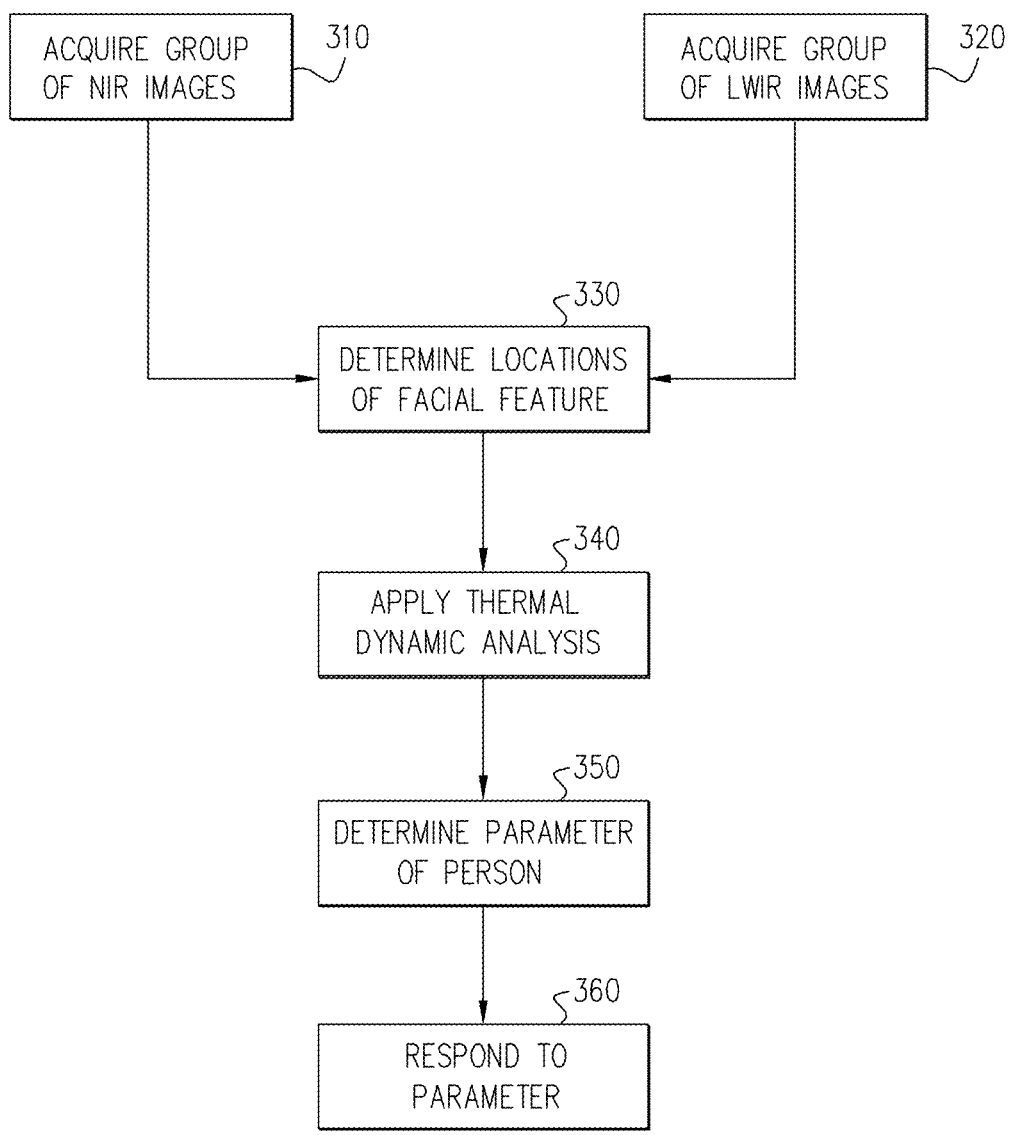
FIG. 12 is an example of a method.

The described system provides a novel, cost effective way to assess human physical and mental state which is:
a. Contactless and completely implicit (meaning, requires no participating of the monitored subject)
b. Multi person monitoring simultaneously
c. Works for people in rest or in motion
d. Works in stationary or moving/vibrating environments FIG. 12 illustrates method 300.

Method 300 is for monitoring a person.

For simplicity of explanation it is assumed that the other sensor is a NIR sensor and that the spatial resolution of the NIR sensor exceeds the spatial resolution of the LWIR sensor.

Method 300 may include steps 305, 310, 320, 330, 340, 350 and 360.

Step 305 may include receiving or calculating compensation parameters that are applied during an applying of the compensation process mentioned in step 330.

Step 305 may include calculating the compensation parameters by applying a supervised deep learning training process that involves acquiring NIR images of a thermal target and LWIR images of The thermal target.

Step 305 may include receiving the compensation parameters, wherein the compensation parameters are generated by applying a supervised deep learning training process that involves acquiring NIR images and LWIR images of a thermal target.

Step 310 may include acquiring a group of near infrared (NIR) images of a face of the person by a NIR imager.

Step 320 may include acquiring a group of longwave infrared (LWIR) images of the face of the person by a LWIR imager. The LWIR imager is mechanically coupled to the NIR imager. A spatial resolution of the NIR imager may or may not exceed a spatial resolution of the LWIR imager.

Steps 310 and 320 may be followed by step 330 of determining locations of a facial feature of the person within the group of the LWIR images and within the group of the NIR images. Step 330 may include finding the NIR pixels and the LWIR pixels of the same facial feature (or of the same point or area of the facial feature).

The determining may include applying a compensation process for compensating for differences between the acquiring of the group of LWIR images and the acquiring of the group of NIR images.

The compensating process may include image rectification and modalities compensation. Step 330 may be executed by modules such as 101, 102 and 104 of FIG. 8.

The facial feature may be a facial sweat gland.

The facial feature may be or may include a left nostril, a right nostril, and a month and wherein the at least one parameter of the user may include a respiration parameter.

The facial feature may be or may include at least one superficial blood vessel and wherein the at least one parameter of the user may include a heart rate parameter.

Step 330 may include determining a difference between a (a) location of the facial feature in certain NIR image obtained at a certain point of time, and (b) a location of the facial feature in certain LWIR image obtained at the certain point of time; and (c) determining a distance between the facial feature and at least one of the NIR imager and the LWIR imager, based on the difference.

Step 330 may start by searching for the head of the person within at least one of the NIR images and the LWIR images. The LWIR image may be more reliable and thus step 330 may start by searching for the head of the person within the LWIR image. A corresponding head in an NIR image may be found and the cropper head of the LWIR image and the cropper hear of the NIR image may be aligned to each other—virtually placed on each other to find corresponding regions (or patches) in these images.

Step 330 may include validating, for each LWIR image of the LWIR images, the location of the facial feature of the person within the LWIR image.

Step 330 may be followed by step 340 of applying a thermal dynamic analysis on pixels of the facial feature within the LWIR images.

Step 340 may include applying a LWIR thermal dynamic analysis on one or more LWIR images.

Step 340 may include applying a NIR thermal dynamic analysis on one or more NIR images.

Step 340 may include applying a thermal dynamic analysis on one or more NIR images and on one or more LWIR images.

The applying of the thermal dynamic analysis may include applying a neural network based thermal dynamic analysis.

The at least one parameter of the user has a frequency within a predefined frequency range, and wherein the applying of the thermal dynamic analysis may include applying a band pass filter for rejecting signals outside the predefined frequency range.

Step 340 may be followed by step 350 of determining, based on an outcome of thermal dynamic analysis, at least one parameter of the person.

The at least one parameter of the person is selected out of at least one of (a) a physiological parameter of the person, (b) a psychological parameter of the person, and (c) a behavioral parameter of the person.

The at least one parameter of the person may include facial movement patterns of the person.

The at least one parameter of the person may include a well-being of the person.

The at least one parameter of the person may include an emotion of the person.

The at least one parameter of the person may be a personalized heat flow distribution of the person.

Step 350 may be followed by step 360 of responding to the at least one parameter of the person.

Step 360 may include generating a alert, requesting a person to calm down or to perform another operation or even to avoid from performing an operation. The system may be configured to performing a driving related operation based on the at least one parameter of the user.

Step 360 may include controlling a driving of the vehicle based on the at least one parameter of the user.

The system can improve public safety in a variety of situations: private/public transportation, airports, waiting rooms, homes and more by continuously and implicitly detecting situations of abnormal mental and/or physical conditions allowing detection of either people in need to help or attention or even by detecting people about to commit radical activities.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that can be executed by the system and should be applied mutatis mutandis to a non-transitory computer readable medium that stores instructions that once executed by a computer result in the execution of the method.

Any reference in the specification to a non-transitory computer readable medium that stores instructions should be applied mutatis mutandis to a method that is implemented when executing the instructions and should be applied mutatis mutandis to system capable of executing the instructions.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation; a single operation may be distributed in additional operations and operations may be executed at least partially overlapping in time. Moreover, alternative embodiments may include multiple instances of an operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The terms "including", "comprising", "having", "consisting" and "consisting essentially of" are used in an interchangeable manner. For example—any method may include at least the steps included in the figures and/or in the specification, only the steps included in the figures and/or the specification.

We claim:

1. A method for monitoring a person, the method comprises:
   acquiring a group of longwave infrared (LWIR) images of a face of the person by a LWIR imager;
   acquiring an other group of images that differ from LWIR images of a face of the person by an other imager that differs from a LWIR imager;
   wherein the LWIR imager is mechanically coupled to the other imager; and wherein a spatial resolution of the other imager exceeds a spatial resolution of the LWIR imager;
   determining locations of a facial feature of the person within the group of the LWIR images and within the group of the other images, wherein the determining comprises applying a compensation process for compensating for differences between the acquiring of the group of LWIR images and the acquiring of the group of the other images;
   applying a thermal dynamic analysis on pixels of the facial feature within the LWIR images; and
   determining, based on an outcome of the thermal dynamic analysis, at least one parameter of the person.

2. The method according to claim 1 wherein the other imager is a visual light imager that is configured to detect light within at least one spectral band of visual light.

3. The method according to claim 1 wherein the other imager is a red, green and blue imager.

4. The method according to claim 1 wherein the other imager is a near infrared (NIR) imager and the other group of images is a group of NIR images.

5. The method according to claim 4 wherein the thermal dynamic analysis is a LWIR thermal dynamic analysis that is applied on one or more LWIR images.

6. The method according to claim 4 comprising receiving or calculating compensation parameters that are applied during the applying of the compensation process.

7. The method according to claim 4 comprising calculating the compensation parameters by applying a supervised deep learning training process that involves acquiring NIR images of a thermal target and LWIR images of the thermal target.

8. The method according to claim 4 comprising receiving the compensation parameters, wherein the compensation parameters are generated by applying a supervised deep learning training process that involves acquiring NIR images and LWIR images of a thermal target.

9. The method according to claim 4 comprising:
   determining a difference between a (a) location of the facial feature in certain NIR image obtained at a certain point of time, and (b) a location of the facial feature in certain LWIR image obtained at the certain point of time; and
   determining a distance between the facial feature and at least one of the NIR imager and the LWIR imager, based on the difference.

10. The method according to claim 4 comprising validating, for each LWIR image of the LWIR images, the location of facial feature of the person within the LWIR image.

11. The method according to claim 4 comprising searching for the head of the person within at least one of the NIR images and the LWIR images.

12. The method according to claim 1 wherein the at least one parameter of the person is selected out of at least one of (a) a physiological parameter of the person, (b) a psychological parameter of the person, and (c) a behavioral parameter of the person.

13. The method according to claim 1 comprising performing a driving related operation based on the at least one parameter of the user.

14. The method according to claim 1 comprising controlling a driving of the vehicle based on the at least one parameter of the user.

15. The method according to claim 1 wherein the applying a thermal dynamic analysis comprises applying a neural network based thermal dynamic analysis.

16. The method according to claim 1 wherein the facial feature comprises a left nostril, a right nostril, and a month and wherein the at least one parameter of the user comprises a respiration parameter.

17. The method according to claim 1 wherein the facial feature comprises at least one superficial blood vessel and wherein the at least one parameter of the user comprises a heart rate parameter.

18. The method according to claim 17 wherein the at least one parameter of the user has a frequency within a predefined frequency range, and wherein the applying of The thermal dynamic analysis comprising applying a band pass filter for rejecting signals outside the predefined frequency range.

19. The method according to claim 1 wherein facial feature comprises facial sweat glands and wherein the at least one parameter of the user comprises facial sweat glands activity.

20. The method according to claim 1 wherein the at least one parameter of the person comprises facial movement patterns of the person.

21. The method according to claim 1 wherein the at least one parameter of the person comprises a well-being of the person.

22. The method according to claim 1 wherein the at least one parameter of the person comprises an emotion of the person.

23. The method according to claim 1 wherein the at least one parameter of the person is a personalized heat flow distribution of the person.

24. A non-transitory computer readable medium that stores instructions for: acquiring a group of longwave infrared (LWIR) images of a face of the person by a LWIR imager;
acquiring an other group of images that differ from LWIR images of a face of the person by an other imager that differs from a LWIR imager;
wherein the LWIR imager is mechanically coupled to the other imager; and wherein a spatial resolution of the other imager exceeds a spatial resolution of the LWIR imager;
determining locations of a facial feature of the person within the group of the LWIR images and within the group of the other images, wherein the determining comprises applying a compensation process for compensating for differences between the acquiring of the group of LWIR images and the acquiring of the group of the other images;
applying a thermal dynamic analysis on pixels of the facial feature within the LWIR images; and
determining, based on an outcome of the thermal dynamic analysis, at least one parameter of the person.

25. The non-transitory computer readable medium according to claim 24 wherein the other imager is a visual light imager that is configured to detect light within at least one spectral band of visual light.

26. The non-transitory computer readable medium according to claim 24 wherein the other imager is a red, green and blue imager.

27. The non-transitory computer readable medium according to claim 24 wherein the other imager is a near infrared (NIR) imager and the other group of images is a group of NIR images.

28. A system comprising, a longwave infrared (LWIR) imager, an other imager, a processor and a mechanical setup; wherein the LWIR imager is configured to acquire a group of LWIR images of a face of a person; wherein the other imager is configured to acquire a group of other images of the face of the person; wherein the mechanical setup is configured to mechanically couple the LWIR imager to the other imager; wherein a spatial resolution of the other imager exceeds a spatial resolution of the LWIR imager; wherein the processor is configured to (a) determine locations of a facial feature of the person within the group of the LWIR images and within the group of the other images, wherein the determining comprises applying a compensation process for compensating for differences between the acquiring of the group of LWIR images and the acquiring of the group of other images; (b) apply a thermal dynamic analysis on pixels of the facial feature within the LWIR; and (c) determine, based on an outcome of the thermal dynamic analysis, at least one parameter of the person.

29. The system according to claim 28 wherein the other imager is a visual light imager that is configured to detect light within at least one spectral band of visual light.

30. The system according to claim 28 wherein the other imager is a red, green and blue imager.

31. The system according to claim 28 wherein the other imager is a near infrared (NIR) imager and the other group of images is a group of NIR images.

32. A system comprising a local unit and a remote computer; wherein the local unit comprises a longwave infrared (LWIR) imager, an other imager, a processor, and a mechanical setup; wherein the other imager is configured to acquire a group of other images of a face of the person; wherein the LWIR imager is configured to acquire a group of LWIR images of a face of the person; wherein the mechanical setup is configured to mechanically couple the LWIR imager to the other imager; wherein a spatial resolution of the other imager exceeds a spatial resolution of the LWIR imager; wherein each one of the processor and the remote computer are configured to perform a part of a process that comprises (a) determining locations of a facial feature of the person within the group of the LWIR images and within the group of the other images, wherein the determining comprises applying a compensation process for compensating for differences between the acquiring of the group of LWIR images and the acquiring of the group of other images; (b) applying a thermal dynamic analysis on pixels of the facial feature within the LWIR images; and (c) determining, based on an outcome of the thermal dynamic analysis, at least one parameter of the person.

33. The system according to claim 32 wherein the other imager is a visual light imager that is configured to detect light within at least one spectral band of visual light.

34. The system according to claim 32 wherein the other imager is a red, green and blue imager.

35. The system according to claim 32 wherein the other imager is a near infrared (NIR) imager and the other group of images is a group of NIR images.

* * * * *